UNITED STATES PATENT OFFICE.

OTTO HUGO SHULTZ, OF WINDSOR, ONTARIO, CANADA, ASSIGNOR OF TWO-TENTHS TO FRED M. BILL AND TWO-TENTHS TO ROY M. FOSTER, BOTH OF EDMONTON, ALBERTA, CANADA, AND TWO-TENTHS TO LEONARD R. BENSON, OF WINDSOR, ONTARIO, CANADA.

PAINT COMPOSITION.

1,229,337.  Specification of Letters Patent.  Patented June 12, 1917.

No Drawing.  Application filed March 14, 1916.  Serial No. 84,206.

*To all whom it may concern:*

Be it known that I, OTTO H. SHULTZ, a subject of the King of Great Britain, residing at Windsor, in the Province of Ontario and Dominion of Canada, have invented new and useful Improvements in Paint Compositions, of which the following is a specification.

This invention relates to improvements in paint compositions, and its primary object is to provide a composition for use as a filler for ordinary paints, whereby the volume, spreading capacity and general efficiency of inside and outside paints of the general character in common use may be materially increased at a very low cost.

A further object of the invention is to provide a paint composition which will render any ordinary paint applicable to wood, plaster, stone, brick, metal or other materials, so as to adhere closely without peeling, blistering, scaling or being otherwise affected by atmospheric changes, and which will cling closely to surfaces to which ordinary paints will not adhere.

A still further object of the invention is to provide a composition which will render an ordinary paint water and fire-proof, destructive of germicidal and fungoid life, and also of maximum hardness, durability and luster producing qualities.

In carrying my invention into practice I provide a composition made from the following substances in the following proportions:

| | |
|---|---|
| Lead monoxid or litharge | 1.250 |
| Silicate of sodium | 2.500 |
| Methylated spirits | 6.250 |
| Common salt | 1.250 |
| Alum | 1.250 |
| Lead acetate | 2.500 |
| Zinc sulfate | 5. |
| Potassium acetate | .234 |
| Gum arabic | 1.250 |
| Common rosin | 3.750 |
| Oxalic acid | .625 |
| Caustic soda | 5. | and

| | |
|---|---|
| Water | 969.141 |

In preparing the composition for use, the substances are combined in the following proportions for combination with a certain quantity of water, say 40 gallons, the water being reckoned as 10 pounds or 160 ounces to the gallon:

| | Ounces. |
|---|---|
| Lead monoxid or litharge | 8 |
| Silicate of sodium | 16 |
| Methylated spirits | 40 |
| Common salt | 8 |
| Alum | 8 |
| Lead acetate | 16 |
| Zinc sulfate | 32 |
| Potassium acetate | 1½ |
| Gum arabic | 8 |
| Common rosin | 24 |
| Oxalic acid | 4 |
| Caustic soda | 32 | and

| | |
|---|---|
| Water | 6,400 |

This composition may be mixed with any ordinary paint made for inside or outside use and having or including a coloring material or pigment ground in or otherwise combined with an oil vehicle, such as linseed oil, an efficient mixture being produced by combining the paint and composition in equal quantities. The composition can be used with white paint or with paint of any color or tint, it being only necessary to add coloring matter according to the shade which it is desired the paint should have.

It will be observed that the caustic soda is in sufficient amount not only to precipitate the lead acetate and zinc sulfate as hydroxids, but also to dissolve these hydroxids, forming sodium plumbate and sodium zincate, and in addition there is sufficient caustic soda left over to saponify all the rosin. These substances confer drying properties and give body to thicken the paint, and, through the action of their salts and acids, they also adapt the oil to form with the water an emulsion, thus keeping the soluble ingredients diffused throughout the vehicle. The caustic soda also has a softening action upon the water, thereby facilitating the combination of the ingredients, while the methylated spirits and common salt act as preservatives to keep the water from freezing in cold weather, while the gum arabic and common salt also serve to produce a desired gloss. The oxalic acid is most desirable as a bleaching agent for maintaining the color of white paint, and in this combination reacts with the litharge, forming an insoluble oxalate. The alum is used as a binder and water-proofing agent, and in combination with the sodium acetate, sodium sulfate, potassium acetate, sodium chlorid and the methylated spirits increases the anti-freezing properties of the mixture to a high degree. The silicate of sodium by exposure to the atmosphere gradually forms an insoluble silicate, giving hardness, durability and toughness to the paint, and also rendering the same fire-proof.

I claim:—

1. A paint composition containing the reaction products of lead monoxid or litharge, silicate of sodium, methylated spirits, common salt, alum, lead acetate, zinc sulfate, potassium acetate, gum arabic, common rosin, oxalic acid, caustic soda and water.

2. A paint composition containing the reaction products of lead monoxid or litharge, 8 ounces; silicate of sodium, 16 ounces; methylated spirits, 40 ounces; common salt, 8 ounces; alum, 8 ounces; lead acetate, 16 ounces; zinc sulfate, 32 ounces; potassium acetate, 1½ ounces; gum arabic, 8 ounces; common rosin, 24 ounces; oxalic acid, 4 ounces; caustic soda, 32 ounces; and water, 6,400 ounces.

In testimony whereof I affix my signature in presence of two witnesses.

OTTO HUGO SHULTZ.

Witnesses:
 LEONARD D. STEPHENSON,
 LEONARD R. BENSON.

Copies of this patent may be obtained for five cents each, by addressing the "Commissioner of Patents, Washington, D. C."